United States Patent [19]

Bruson, deceased, et al.

[11] Patent Number: 4,611,043

[45] Date of Patent: Sep. 9, 1986

[54] COATING COMPOSITION PREPARED BY REACTING AN ISOCYANATE PREPOLYMER WITH DICYCLOPENTENYL ALCOHOL

[75] Inventors: Herman A. Bruson, deceased, late of Woodbridge, Conn.; by Virginia H. Bruson, executrix; Kurt C. Frisch, Grosse Ile, Mich.

[73] Assignee: Virginia H. Bruson, Woodbridge, Conn.

[21] Appl. No.: 506,639

[22] Filed: Jun. 22, 1983

[51] Int. Cl.$^4$ .............................................. C08G 18/30
[52] U.S. Cl. ..................................... 528/49; 428/423.1
[58] Field of Search ................. 528/75, 49; 428/423.1

[56] References Cited

U.S. PATENT DOCUMENTS

| 2,358,314 | 9/1944 | Bruson | 568/665 |
|---|---|---|---|
| 2,393,609 | 1/1946 | Bruson | 568/665 |
| 2,393,610 | 1/1946 | Bruson | 568/665 |
| 2,393,611 | 1/1946 | Bruson | 568/611 |
| 2,416,250 | 1/1947 | Bruson | 568/611 |
| 3,358,039 | 12/1967 | Chang | 528/75 |
| 3,410,912 | 11/1968 | Bruson et al. | 528/49 |
| 4,395,532 | 7/1983 | Bruson | 528/75 |

*Primary Examiner*—Maurice J. Welsh
*Attorney, Agent, or Firm*—Bachman & LaPointe

[57] ABSTRACT

Low cost protective coating composition. The coating composition is the reaction product of (I) an isocyanate terminated prepolymer which comprises the reaction product of at least one polyurethane-forming reagent containing a plurality of isocyanate groups and at least one polyfunctional polyhydric alcohol and (II) dicyclopentenyl alcohol.

5 Claims, No Drawings

COATING COMPOSITION PREPARED BY REACTING AN ISOCYANATE PREPOLYMER WITH DICYCLOPENTENYL ALCOHOL

BACKGROUND OF THE INVENTION

It is highly desirable to develop a low cost resistant coating composition. Coating compositions have wide application in a variety of areas. Often, however, coating compositions which provide high chemical resistivity also are characterized by high cost. Clearly, it is desirable to develop such a coating composition which is characterized by low cost.

In addition, it is desirable to develop a low cost coating composition which has a variety of desirable characteristics, especially being resistant to chemical attack for application to wood, particle board, or the like, as well as to metal surfaces such as to aircraft surfaces, for example, to provide resistance to the normally corrosive jet fuels and hydraulic fluids as well as to protect the leading edge of aircraft from foreign matter. It is further desirable to provide such a coating material which can be easily applied in a thin and highly protective coating without changing the physical appearance of the coated material. Further, it is desirable to provide such a coating material which is characterized by rapid curing, which dries quickly under atmospheric conditions and which is characterized by other properties desirable in materials of this type such as good shelf stability, good color properties, improved flexibility, good susceptibility to pigmented formulations and otherwise good physical properties.

It can be readily appreciated that the requirements for a successful coating material are numerous and varied. The art has long sought successful coating materials which meet the foregoing requirements with one or more disadvantages frequently significantly detracting from such art materials.

Accordingly, it is a principal object of the present invention to provide a low cost resistant coating composition.

It is a still further object of the present invention to provide such a coating composition which is suitable for a variety of applications and which is easy to apply in a thin highly protective coating for a variety of surfaces such as wood, metal and the like.

It is an additional object of the present invention to provide a coating composition as aforesaid which is characterized by highly desirable characteristics such as rapid curing, improved flexibility, good solvent resistance, good shelf stability, good color properties and the like.

It is a still further object of the present invention to provide a coating composition as aforesaid having surprisingly improved properties over the composition of copending U.S. patent application Ser. No. 361,366, By Herman A. Bruson, Filed March 25, now U.S. Pat. No. 4,395,532.

Further objects and advantages of the present invention will appear hereinbelow.

SUMMARY OF THE INVENTION

In accordance with the present invention, the foregoing objects and advantages may be readily achieved and a low cost resistant coating composition readily obtained. The coating composition of the present invention is characterized by low cost and good protective qualities. The composition of the present invention comprises the reaction product of (I) an isocyanate terminated prepolymer which comprises the reaction product of at least one polyurethane-forming reagent containing a plurality of isocyanate groups and at least one polyfunctional polyhydric alcohol and (II) dicyclopentenyl alcohol. The coating composition is prepared by reacting together the polyurethane-forming reagent and the polyhydric alcohol preferably using an excess of the isocyanate material to form the prepolymer. The coating composition is then prepared by reacting the prepolymer and the dicyclopentenyl alcohol under ambient conditions, preferably in the presence of an effective catalyst and optionally in the presence of an inert solvent such as benzene or toluene.

DETAILED DESCRIPTION

This invention relates to chemistry and particularly to novel organic polymer compositions adapted to provide highly desirable and improved physical and chemical properties, particularly when applied as surface coatings over films, foils and other fabricated articles. The coating compositions of the present invention have particularly desirable and indeed surprising physical properties. They are characterized by improved flexibility and generally improved physical properties. For example, they cure rapidly under ambient conditions and are characterized by good solvent resistance. Furthermore, they have good shelf stability which is highly desirable in materials of this type and have good color properties. Further, they are susceptible to pigmented formulations. The coatings cure, for example, at room temperature to a high hardness and at the same time a good impact resistance which is highly desirable.

The compositions of the present invention are formed by first forming an isocyanate terminated prepolymer which comprises the reaction product of at least one polyurethaneforming reagent containing a plurality of isocyanate groups and at least one polyfunctional polyhydric alcohol. Generally, aliphatic or cycloaliphatic diisocyanates as well as polyisocyanates and adducts of isocyanates may be employed. Typical aliphatic and cycloaliphatic isocyanates include: 1,6-hexamethylene diisocyanate, methylene bis(1,4-cyclohexylisocyanate), 1,3-diisocyanato cyclohexane, 1,4-diisocyanato cyclohexane, 1,4-diisocyanato cyclohexane, 1,3-xylylene diisocyanate, 1,4-xylylene diisocyanate, 1,3- and 1,4-bis (isocyanatomethyl) cyclohexane, isophorone diisocyanate and similar diisocyanates. In addition, polyisocyanates which are either adducts of diisocyanates such as addition products of trimethylpropane with tolylene diisocyanate or 1,6-hexamethylene diisocyanate or addition products such as is derived from the reaction of 3 moles of 1,6-hexamethylene diisocyanate and 1 mole of water ("Desmodur N", Mobay Chemical Co.). Isocyanate derivates of isocyanurates such as trimerization products of diisocyanates such as of isophorone diisocyanate ("T-1850", Veba Chemie) or of tolylene diisocyanate ("Desmodur IL", Mobay Chemical Co.) can also be used. Aromatic polyfunctional isocyanates such as poly(methylene) poly(phenylene) poly(isocyanates), known also as "crude" or polymeric MDI or similar products having for example an NCO functionality of 2.1 to 3.0 could be used.

As indicated hereinabove, the polyurethane-forming reagent is reacted with at least one polyfunctional polyhydric alcohol. Generally, one may employ any polyol having at least two hydroxyl groups. Polyether polyols such as poly(oxypropylene) glycols or poly(oxypropylene) adducts of glycerol or trimethylolpropane or of higher functional polyols such as pentaerythritol of equivalent weights ranging preferentially from 100 to 1000 could be used. In addition, polyethers such as poly(1,4-oxytetramethylene) glycols preferably of equivalent weight ranging between 300 and 1000 could be used. Hydroxyl-terminated polyesters preferably having a functionality of 2 to 3 such as poly(adipate) glycols or polyols or mixtures of poly(adipate) and poly(isophthalate) glycols and polyols as well as poly(caprolactones) can be used with an equivalent weight ranging preferentially between 100 and 1250. In addition to hydroxyl-terminated polyethers, short diols or triols such as dipropylene glycol, 1,4-butanediol, 1,6-hexanediol, 1,4-bis(hydroxyethyl) or 1,4-bis(hydroxypropyl) adduct of bisphenol A can be readily used.

The reaction between the polyol and the polyurethane-forming reagent proceeds readily at room temperature or at slightly elevated temperatures preferably in the presence of a suitable catalyst such as dibutyltin dilaurate or stannous octoate or other suitable metallic catalysts. Preferably, an excess of the isocyanate material is employed.

The prepolymer is then reacted with the dicyclopentenyl alcohol to form the coating composition of the present invention. Alternatively, the polyurethane-forming reagent, polyfunctional polyhydric alcohol and dicyclopentenyl alcohol can all be reacted together at the same time.

The prepolymer if separately prepared may be stored for indefinite periods of time and the prepolymer and dicyclopentenyl alcohol component reacted together when needed. The reaction between the prepolymer and the dicyclopentenyl alcohol proceeds immediately and vigorously, usually indicated by a rise in temperature. Generally, as the reaction proceeds and heat is involved the solution darkens.

Equimolar amounts of the prepolymer and the dicyclopentenyl alcohol may be employed based on NCO content of the isocyanate although it is preferred to employ an excess of the alcohol component. One can readily vary from the foregoing proportions without danger, for example, one would have unreactive substituents which, depending on the amount thereof, may be readily removed if desired.

Ultraviolet light absorbers or other additives may be desirable in the composition in order to prevent degradation upon exposure to sunlight, such as for example, benzophenones and the like.

It is preferred to employ catalysts in order to speed up the reaction process such as metallic catalysts as dibutyltin dilaurate or stannous octoate or tertiary amines such as dimethylcyclohexylamine or similar tertiary amines. This enables one to complete the reaction at a faster rate and to provide improved properties. Amounts of catalysts may range preferably between 0.01% to 0.3% based on solids.

These catalysts can be used for both reactions, that is, in the formation of the prepolymer and in the formation of the final product. Combination catalysts may be used such as cobalt, manganese or lead driers as naphthenates, octoates, tallates, decanoates, etc.

Solvent mixtures are preferably employed including mixtures of cellosolve acetate (urethane grade), methyl ethyl ketone, toluene and xylene, although many other solvent or solvent mixtures could of course readily be employed. It is preferred that the catalyst be added to the solvent solution of the prepolymers in order to prevent premature degradation of the product due to the exothermic nature of the final reaction.

All reactions should be strictly controlled so that the temperature of the reaction preferably ranges between 50 and 80° C.

The present invention will be more readily understandable from a consideration of the following illustrative examples.

EXAMPLE I

Preparation of the Isocyanate Terminated Prepolymer

The prepolymer was synthesized from 2 moles of the trifunctional aliphatic isocyanate Desmodur N-75 and 1 mole of polyoxypropylene glycol using a small amount of tin dioctoate catalyst and cellosolve acetate solvent. The reaction formulation is set out below.

| Material | Eq. Wt. | Moles | Parts by Weight |
| --- | --- | --- | --- |
| Desmodur N-75 | 255.0 | 2 | 1530.0 |
| Poly(oxypropylene)glycol | 249.33 | 1 | 498.7 |
| Cellosolve acetate, solvent | 166.9 | | 166.9 |
| Tin dioctoate catalyst | 0.05% | | |
| | | | 2195.6 |

Theoretical equivalent wt. per NCO = $\frac{2195.6}{4}$ = 548.9

Theoretical NCO content = 7.65%

The glycol was demoisturized in a vacuum at about 70° C. overnight. Then it was blended in a reactor with the isocyanate compound. The reactor was equipped with a stirrer, heating mantel and dry nitrogen blanket. The reaction was carried out at the temperature of 70–75° C. The catalyst was added in order to speed up the formation of the prepolymer. In about three hours the theoretical amount of NCO was reached and the reaction was complete.

EXAMPLE II

Synthesis of the Polymer Terminated With Unsaturated Groups

The final polymer was formed by reacting the isocyanate terminated prepolymer from Example I with dicyclopentenyl alcohol using the following formulation.

| Material | Eq. Wt. | Moles | Parts by Weight |
| --- | --- | --- | --- |
| Isocyanate terminated prepolymer | 548.9 | 1 | 2195.6 |
| Dicyclopentenyl alcohol | 150.0 | 4 | 600.0 |
| Cellosolve Acetate | Solvent | | 200.0 |
| Tin dioctoate catalyst | 0.02% | | |

The isocyanate terminated prepolymer, dicyclopentenyl alcohol, solvent and catalyst were stirred in a reactor for ½ hour at 70° C. until all the isocyanate groups were reacted with the dicyclopentenyl alcohol.

EXAMPLE III

Compounding of the Coating Formulation and Casting of Films

The contents of the reactor were cooled down to the room temperature. The driers, Co and Mn naphthenates, were added in the amount of 0.025% each per total weight of the formulation. The six mils wet films were cast on glass and aluminum panels with a doctor blade. All coated panels were cured at room temperature for 48 hours. Then some of them were baked at 90° C. and some at 120° C. for 2 hours. Afterwards, they all were submitted for testing of Sward hardness, Gardner impact test, solvent resistance.

The film hardness was measured with a Sward rocker on a glass panel in accordance with the ASTM D-1684 control. The impact test was performed on aluminum panels according to ASTM D-2796-69. The Gardner impact tester contained a 2 lb. steel rod, ¼" diameter punch and 9/16" diameter die. Solvent resistance was run on films cast on glass panels according to ASTM D-2792-69. The resistance to mineral spirits, isopropanol and toluene was recorded.

The testing data of the resulting coating is compiled in Table I, below, from which it can be seen that the properties were surprisingly good.

TABLE I
PROPERTIES OF THE POLYURETHANE COATING CURED BY OXIDATION THROUGH THE UNSATURATED GROUPS

| Properties | Designation of Coating | | | | |
|---|---|---|---|---|---|
| | $A_0$ | $A_1$ | $A_2$ | $A_5$ | $A_6$ |
| Curing conditions | Room temp. 3 days | 90° C. 2 hrs. | 90° C. 2 hrs. | 120° C. 2 hrs. | 120° C. 2 hrs. |
| Sward A hardness | 54 | 56 | 54 | 60 | 58 |
| Change of Color | does not discolor | very slight yellowish | v. slight yellowish | yellows | yellows |
| Gardner impact, lbs. inch | 30 | 30 | 30 | 30 | 30 |
| Solvent resistance | exposure to solvent 2 hrs. | | | | |
| Mineral spirits | no effect | no effect | no effect | no effect | no effect |
| Iso-propanol | no effect | no effect | no effect | no effect | no effect |
| Toluene | blisters | blisters | blisters | no effect | no effect |

The synthesized polymer containing unsaturated terminal group cured by oxidation with Co and Mn naphthenates are readily cured by oxidation with Co and Mn naphthenates. Generally, on exposure to room temperature it cured dry to the touch by allowing it to stand overnight. Shelf stability was quite good. Generally, the stability should be as good as the stability of regular oil paints. A slight discoloration upon baking at elevated temperature was found but this was not unexpected and does not detract from the desirability of the composition. The coating as cured at room temperature did not show the discoloration. Further, the coating cured at room temperature to a high hardness and at the same time a good impact resistance and an impressive resistance to solvents.

EXAMPLE IV

A coating composition of the present invention based on a polyurethane type polymer, terminated with unsaturated groups and cured by oxidation, at room temperature was synthesized.

An aliphatic biuret triisocyanate, Desmodur L 2291-A, a trifunctional aliphatic isocyante, was used as the isocyanate component.

Desmophen 650 A-65, a saturated polyester resin, was used as the hydroxyl component.

Dicyclopentenyl alcohol was employed for termination of the urethane polymer with the unsaturated groups.

A catalyst, T-9, stannous octoate, was used to speed up the urethane reaction.

Cobalt naphthenate was employed to promote the oxidation through the unsaturated groups at room temperature.

A. Materials

TABLE II

| Designation | Chemical Identification | Mol. Wt. | Eq. Wt. |
|---|---|---|---|
| Desmophen 650 A-65 | Saturated polyester resin | | 330.8 |
| Dicyclopentenyl alcohol | Dicyclic aliphatic compound containing one hydroxyl group and one unsaturated group | 150.0 | 150.0 |
| Desmodur L-2291-A | Trifunctional aliphatic isocyanate | | 182.0 |
| Stannous octoate | | | |
| Cobalt naphthenate | | | |
| Cellosolve acetate | Solvent | | |
| Toluene | Solvent | | |
| Isopropyl alcohol | Solvent | | |

B. Formulation and Preparation Procedure

One shot urethane coatings, terminated with the unsaturated groups containing stannous octoate and cobalt naphthenate were synthsized using the materials in Table II, above, according to the composition indicated in Table III, below.

TABLE III

| Materials | Eq. Wt. | SAMPLE A | | SAMPLE B | | SAMPLE C | | SAMPLE D | |
|---|---|---|---|---|---|---|---|---|---|
| | | Eq. | Parts by Wt. | Eq. | Parts by Wt. | Eq. | Parts by Wt. | Eq. | Parts by Wt. |
| Polyester | 330.8 | 5 | 1654.0 | 4 | 1323.2 | 3 | 992.4 | 2 | 661.6 |
| Dicyclo-pentenyl alcohol | 150.0 | 2 | 300.0 | 3 | 450.0 | 4 | 600.0 | 5 | 750.0 |
| Isocyanate | 182.0 | 7 | 1274.0 | 7 | 1274.0 | 7 | 1274.0 | 7 | 1274.0 |
| Stannous octoate | | 0.05% | 1.61 | 0.05% | 1.52 | 0.05% | 1.43 | 0.05% | 1.34 |
| Cobalt naphthenate | | 0.05% | 1.61 | 0.05% | 1.52 | 0.05% | 1.43 | 0.05% | 1.34 |
| Total wt. of the charge | | | 3228.0 | | 3047.2 | | 2866.4 | | 2685.6 |
| Equiv. per one unsaturation group | | | 1614.0 | | 1015.6 | | 716.6 | | 537.1 |

Dicyclopentenyl alcohol was demoisturized in a vacuum at 75° C. overnight. Afterwards it was blended with the polyester, stannous octoate and cobalt naphthenate. To this blend, the isocyanate component was added and mixed thoroughly for about 60–70 seconds. The viscosity of the mixture was measured.

The mixed contents of the formulation were left for about 10 minutes to react. Afterwards, six mil wet films were cast on glass, aluminum and steel panels with a doctor blade. All coated panels were cured at room temperature for 48 hours. Afterwards, they all were submitted for testing of Sward hardness, Gardner impact and solvent resistance to toluene, isopropanol and cellosolve acetate.

The film hardness was measured with a Sward hardness rocker on glass panels according to ASTM D-1684. As a control the glass hardness of 100 was used.

The impact test was performed on steel panels coated with the above different formulations according to ASTM D-2796-69. The Gardner impact tester contained a 2 lb. steel rod, ⅝" diameter punch and 9/16" diameter die. The coatings were checked by the direct and indirect impact method.

The solvent resistance was determined on films cast on glass panels, according to ASTM D-2792-69. The resistance to toluene, isopropanol and cellosolve acetate was recorded in Table IV, below.

The testing data of the coatings compiled in Table IV, below, indicate very interesting and surprising and very good properties. The resulting polymers terminated with unsaturated groups and cured by oxidation with cobalt naphthenates were of good quality. All the coatings were dry to touch overnight after exposure to room temperature. The coatings exhibited very high hardness and at the same time a good impact resistance and the resistance to aromatic and oxygenated solvents was exceptionally good.

In addition to the foregoing, it would be possible to produce more flexible and more impact resistant coatings which would still have a comparably good solvent resistance.

TABLE IV

PROPERTIES OF THE ONE SHOT POLYURETHANE COATINGS CURED BY OXIDATION THROUGH THE UNSATURATED GROUPS AT ROOM TEMPERATURE

| Properties | Sample A | Sample B | Sample C | Sample D |
| --- | --- | --- | --- | --- |
| Curing Conditions | Room Temp. | Room Temp. | Room Temp. | Room Temp. |
| Sward A hardness | 90 | 92 | 96 | 96 |
| Gardner impact, lbs. in. | | | | |
| Direct | 25 | 18 | 22 | 24 |
| Indirect | 7 | 3 | 5 | 9 |
| Solvent Resistance after 4 hrs. exposure | | | | |
| Isopropanol | no effect | no effect | no effect | no effect |
| Cellosolve acetate | no effect | no effect | no effect | no effect |
| Toluene | no effect | no effect | no effect | no effect |
| viscosity, cps (Brookfield Viscometer) | 6500 | 5200 | 3500 | 2050 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A low cost resistant coating composition which comprises the reaction product of (I) an isocyanate terminated prepolymer which comprises the reaction product of at least one polyurethane-forming reagent containing a plurality of isocyanate groups and at least one polyhydric alcohol and (II) dicyclopentenyl alcohol.

2. A composition according to claim 1 characterized by rapid curing characteristics to a high hardness.

3. A composition according to claim 1 wherein said polyhydric alcohol is a polyether polyol.

4. A composition according to claim 1 wherein the reaction product is mixed with an effective amount of an inert solvent.

5. A coated article comprising a substrate coated with a composition of claim 1.

* * * * *